June 15, 1965  J. E. ADAMS  3,189,143
MOLDING TRIM ATTACHING CLIP
Filed April 19, 1963
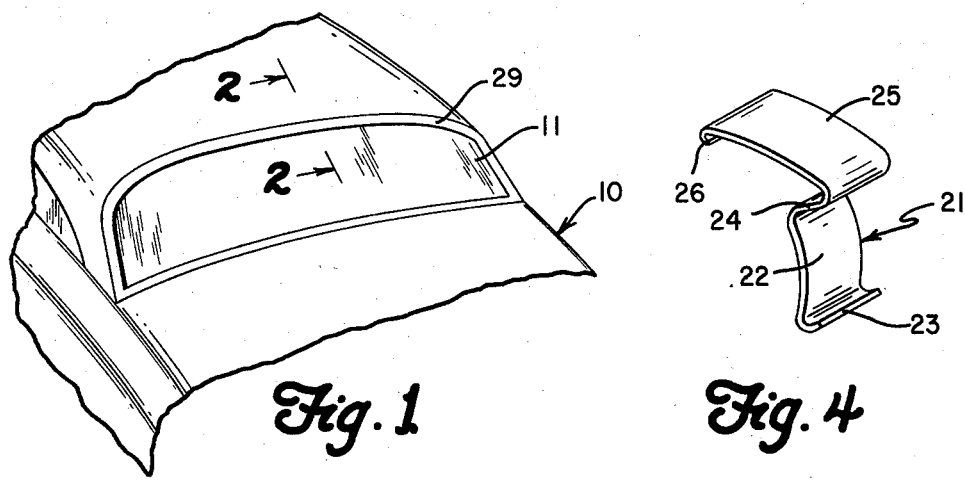
Fig. 1
Fig. 4
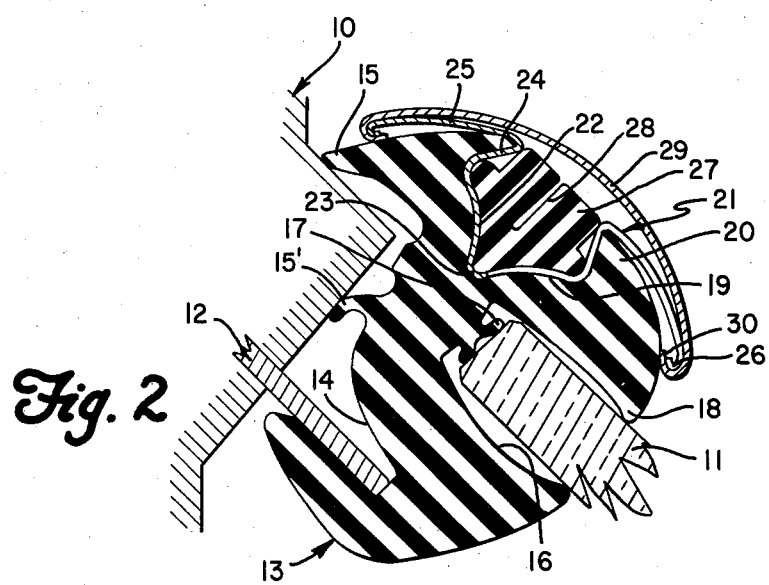
Fig. 2
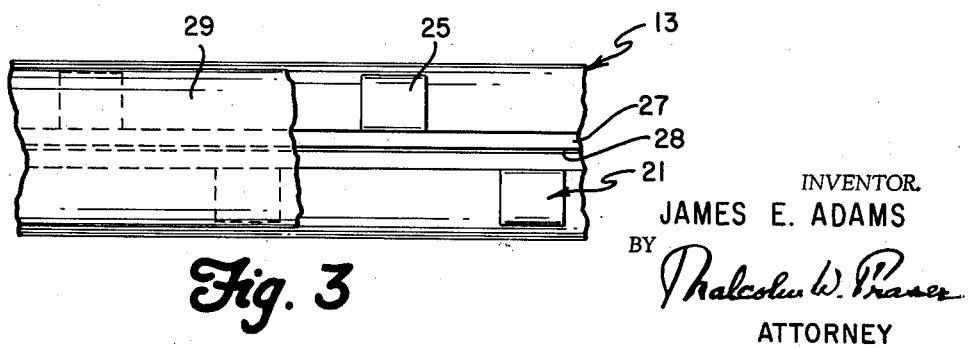
Fig. 3
INVENTOR.
JAMES E. ADAMS
BY
Malcolm W. Fraser
ATTORNEY

United States Patent Office 3,189,143
Patented June 15, 1965

3,189,143
MOLDING TRIM ATTACHING CLIP
James E. Adams, Toledo, Ohio, assignor, by mesne assignments, to The Bishop and Babcock Corporation, Toledo, Ohio, a corporation of Ohio
Filed Apr. 19, 1963, Ser. No. 274,079
3 Claims. (Cl. 189—78)

This invention relates to the mounting of trim moldings around the windows of automobiles, such as the windshield and back light panels, and an object is to produce new and improved device for attaching such moldings to the rubber sealing strips which ordinarily embrace the edge portions of such panels to effect a seal against rain and weather.

Other objects and advantages of the invention will hereinafter appear and, for purposes of illustration but not of limitation, an embodiment of the invention is shown on the accompanying drawings, in which FIGURE 1 is a fragmentary perspective view of an automobile body showing particularly the windshield thereof surrounded by a trim molding;

FIGURE 2 is a greatly enlarged transverse sectional view substantially on the line 2—2 of FIGURE 1;

FIGURE 3 is a fragmentary plan view of a portion of the rubber sealing strip for the windshield and showing several of the molding attaching clips in position of use and also showing a portion of the molding in applied position; and FIGURE 4 is an enlarged perspective view of one of the molding attaching clips.

The illustrated embodiment of the invention comprises an automobile body having the usual glass windshield panel 11. Suitably fixed to the body and extending around the opening which is covered by the windshield is a rigid outwardly projecting plate or fence 12. Applied to the fence 12 is a one-piece resilient rubber sealing strip 13. This extends entirely about the window opening and is formed with an inwardly facing notch to fit over the fence 12. The rubber sealing strip is formed on the inner side with a pair of flexible sealing lips 15 and 15' for engaging the body and effecting a weather seal thereagainst.

Formed in the rubber sealing strip 13 is an outwardly facing notch 16 which extends entirely around the strip and receives and embraces the edge portions of the window panel 11. As shown, at the base of the notch 16 is an integral resilient sealing cushion strip 17 against which the edge of the glass panel 11 abuts. At the mouth of the notch 16 are inwardly extending gripping lips 18 which, as will hereinafter appear, are forced into intimate sealing engagement with opposite faces of the glass panel 11. Formed at the outer side of the glass panel 11 is a wedge-shaped notch 19 which extends entirely about the strip. The notch 19 is formed with upwardly and inwardly inclined wall portions 20 providing a constricted mouth for the notch 19.

Fitting in the wedge shaped notch 19 is a series of spaced molding attaching clips 21 which, as indicated on FIGURE 3, are arranged in equi-distant longitudinally spaced relation. The clips 21 are of one piece sheet metal structure and each clip is formed with an outwardly curved attaching arm 22, which terminates in an upwardly curved lip 23. The lip 23 seats in the bottom of the wedge shaped notch 19 and the arm 22 conforms to and engages the inner wall of the notch. Integral with the upper end of the arm portion 22 is an inwardly inclined upper short arm portion 24 and this portion conforms to the inward inclination of the wall portion 20 which provides the restricted mouth of the notch.

Integral with the upper end of the inclined portion 24 of the clip is an upwardly cambered arm which extends generally at right angles to the attaching arm 22, this arm being indicated at 25. At the free end of the arm 25 is an inwardly curved lip 26.

It will be understood that the clips 21 are alternately arranged in the notch 19, so that the arm portion 25 of one clip extends in one direction and the corresponding arm portions 25 of adjacent clips extend in the opposite direction. Thus the clips are arranged in staggered relation both within the notch 19 and also exteriorly thereof.

Crowded into the notch 19 by a progressive threading action is a resilient rubber spreader 27 in strip form and which is similarly wedge shaped in cross section to conform to the shape of the notch 19. The strip 27 is somewhat larger than the notch so that when in place the strip 27 not only secures the clips 21 in place but also forces the rubber of the sealing strip into intimate engagement with the edge portions of the windshield panel 11. To aid in the flexibility of the spreader strip 27, a longitudinally extending notch 28 is formed in the outer face of the strip.

After the series of attaching clips 21 have been secured in position, the sheet metal molding strip 29 can be readily applied as will be understood by those skilled in this art. The molding strip as shown has an upwardly arched or cambered body and is formed with in-turned edge flanges or lips 30, which hook over the several in-turned lips 26 of the attaching clips.

From the above description it will be apparent that I have provided an extremely simple and efficient device by which the trim molding can be readily applied to the rubber sealing strip. Not only are the clips simple in structure but they can be quickly and easily applied and secured in position by the same spreader strip which secures the rubber sealing strip to the edge portions of the window panel and serves the added purpose of retaining the clips in position of use.

Numerous changes in details of constructions, arrangement and choice of materials may be effected without departing from the spirit of the invention, especially as defined in the appended claims.

What I claim is:

1. In an automobile body having a window panel and a resilient rubber sealing strip embracing the edge portions of the panel and in sealing engagement with the automobile body, said strip having a substantially wedge shaped notch coextensive therewith and disposed adjacent the outer side of the window panel, a series of spaced sheet metal molding receiving clips having a leg portion disposed in said notch and arranged alternately so that the leg portion of one clip engages one side wall of the notch and the leg portion of the adjacent clip engages the other side wall of the notch, and integral laterally extending upwardly cambered arm on the outer end of the leg portion of each of said clips terminating in an inwardly curled lip, the cambered arm of one clip extending in one direction on the outer side of the sealing strip and the cambered arm of the adjacent clip extending in the opposite direction on the outer side of said sealing strip, and a resilient spreader strip crowded into said wedge-shaped notch for retaining the clips in place and clamping the sealing strip to the edge portions of the window panel.

2. The assembly as claimed in claim 1 comprising a trim molding having an upwardly cambered body and inturned edge lips for fittting over the clips with molding lips hooking over the lips on the clips.

3. The assembly as claimed in claim 1 in which the spreader strip is of resilient rubber with its outer end substantially flush with the sealing strip and the wedge-shaped notch has a restricted mouth and the leg portions of the clip conform to the wall configuration of the notch, thereby to militate against the clips being disengaged.

References Cited by the Examiner
UNITED STATES PATENTS

| 2,655,239 | 10/53 | Kenlock | 182—78 |
| 2,660,275 | 11/53 | Beck | 189—78 |

FOREIGN PATENTS

| 531,863 | 1/41 | Great Britain. |
| 789,676 | 1/58 | Great Britain. |

HARRISON R. MOSELEY, *Primary Examiner.*